United States Patent

Kinoshita et al.

(10) Patent No.: US 12,472,457 B2
(45) Date of Patent: Nov. 18, 2025

(54) GAS RECOVERY SYSTEM AND METHOD OF MANUFACTURING ELECTRODE FILM

(71) Applicant: DENSO CORPORATION, Kariya (JP)

(72) Inventors: Shota Kinoshita, Nisshin (JP); Shigehiko Sugiura, Nisshin (JP); Atsuhito Ota, Nisshin (JP); Hironori Tatsumi, Kariya (JP); Nobuhiko Matsuda, Kariya (JP)

(73) Assignee: DENSO CORPORATION, Kariya (JP)

( * ) Notice: Subject to any disclaimer, the term of this patent is extended or adjusted under 35 U.S.C. 154(b) by 399 days.

(21) Appl. No.: 18/308,724

(22) Filed: Apr. 28, 2023

(65) Prior Publication Data

US 2023/0381711 A1 Nov. 30, 2023

(30) Foreign Application Priority Data

May 31, 2022 (JP) .................................. 2022-088378

(51) Int. Cl.
*B01D 53/32* (2006.01)
*B01D 53/04* (2006.01)

(52) U.S. Cl.
CPC ..... *B01D 53/0446* (2013.01); *B01D 53/0407* (2013.01); *B01D 53/326* (2013.01);
(Continued)

(58) Field of Classification Search
CPC ................ B01D 53/0446; B01D 53/04; B01D 53/0407; B01D 53/32; B01D 53/326;
(Continued)

(56) References Cited

U.S. PATENT DOCUMENTS

2017/0113182 A1 4/2017 Voskian et al.
2020/0023307 A1 1/2020 Voskian et al.
(Continued)

FOREIGN PATENT DOCUMENTS

JP 2014-175155 A 9/2014
JP 2018-533470 A 11/2018

OTHER PUBLICATIONS

U.S. Appl. No. 18/308,708, filed Apr. 28, 2023, Ota et al.
U.S. Appl. No. 18/308,713, filed Apr. 28, 2023, Kinoshita et al.
U.S. Appl. No. 18/308,716, filed Apr. 28, 2023, Kinoshita et al.

*Primary Examiner* — Frank M Lawrence, Jr.
*Assistant Examiner* — Frank Lawrence
(74) *Attorney, Agent, or Firm* — Harness, Dickey & Pierce, P.L.C.

(57) ABSTRACT

A gas recovery system configured to recover a recovery target gas from a gas mixture includes electrochemical cells and a gas passage between the electrochemical cells. The electrochemical cell has a working electrode including an adsorbent, and a counter electrode configured to exchange electrons with the working electrode. Electron donation occurs from the counter electrode to the working electrode when a voltage is applied between the working electrode and the counter electrode, such that the adsorbent adsorbs the recovery target gas along with the electron donation. At least one of the working electrode or the counter electrode includes an electrode film. The electrode film includes regions, each of which having a size smaller than a size of the electrochemical cell, and a reducing part that reduces warpage of the electrode film is located adjacent to the regions.

5 Claims, 9 Drawing Sheets

(52) U.S. Cl.
CPC ............... *B01D 2257/504* (2013.01); *B01D 2259/40083* (2013.01)

(58) Field of Classification Search
CPC ............ B01D 2253/25; B01D 2259/40; B01D 2259/40083; B01D 2257/504; Y02E 60/50
USPC ................ 95/90, 139; 96/108, 121; 423/230
See application file for complete search history.

(56) References Cited

U.S. PATENT DOCUMENTS

| | | | |
|---|---|---|---|
| 2022/0134278 A1* | 5/2022 | Umeda | B01D 53/326 204/278 |
| 2022/0184552 A1 | 6/2022 | Voskian et al. | |
| 2022/0387930 A1 | 12/2022 | Iijima et al. | |
| 2023/0381714 A1* | 11/2023 | Kinoshita | B01D 53/326 |
| 2024/0261724 A1* | 8/2024 | Nishiwaki | B01D 53/0407 |
| 2025/0170516 A1* | 5/2025 | Fujita | B01D 53/0407 |

\* cited by examiner

MOUNTING STEP

COATING STEP

AREA FORMING STEP → DRYING STEP

COATING STEP

AREA FORMING STEP

REMOVAL STEP → DRYING STEP

COATING STEP → PRIMARY DRYING STEP

SEPARATING STEP

DRYING STEP

COATING STEP

DRYING STEP

GAS RECOVERY SYSTEM AND METHOD OF MANUFACTURING ELECTRODE FILM

CROSS REFERENCE TO RELATED APPLICATION

This application is based on Japanese Patent Application No. 2022-088378 filed on May 31, 2022, the disclosure of which is incorporated herein by reference.

TECHNICAL FIELD

The present disclosure relates to a gas recovery system and a method of manufacturing an electrode film.

BACKGROUND ART

A device for recovering carbon dioxide recovers carbon dioxide, which is a recovery target gas, from a mixed gas containing carbon dioxide. The device for recovering carbon dioxide includes an electrochemical cell that adsorbs carbon dioxide by causing an electrochemical reaction.

SUMMARY

A gas recovery system configured to recover a recovery target gas from a mixed gas includes electrochemical cells and a gas passage between the electrochemical cells. The electrochemical cell has a working electrode including an adsorbent, and a counter electrode configured to exchange electrons with the working electrode. Electron donation occurs from the counter electrode to the working electrode when a voltage is applied between the working electrode and the counter electrode, such that the adsorbent adsorbs the recovery target gas along with the electron donation. At least one of the working electrode or the counter electrode includes an electrode film. The electrode film includes regions having a size smaller than a size of the electrochemical cell, and a reducing part that reduces warpage of the electrode film is located adjacent to the regions.

DESCRIPTION OF EMBODIMENTS

Figure 1:
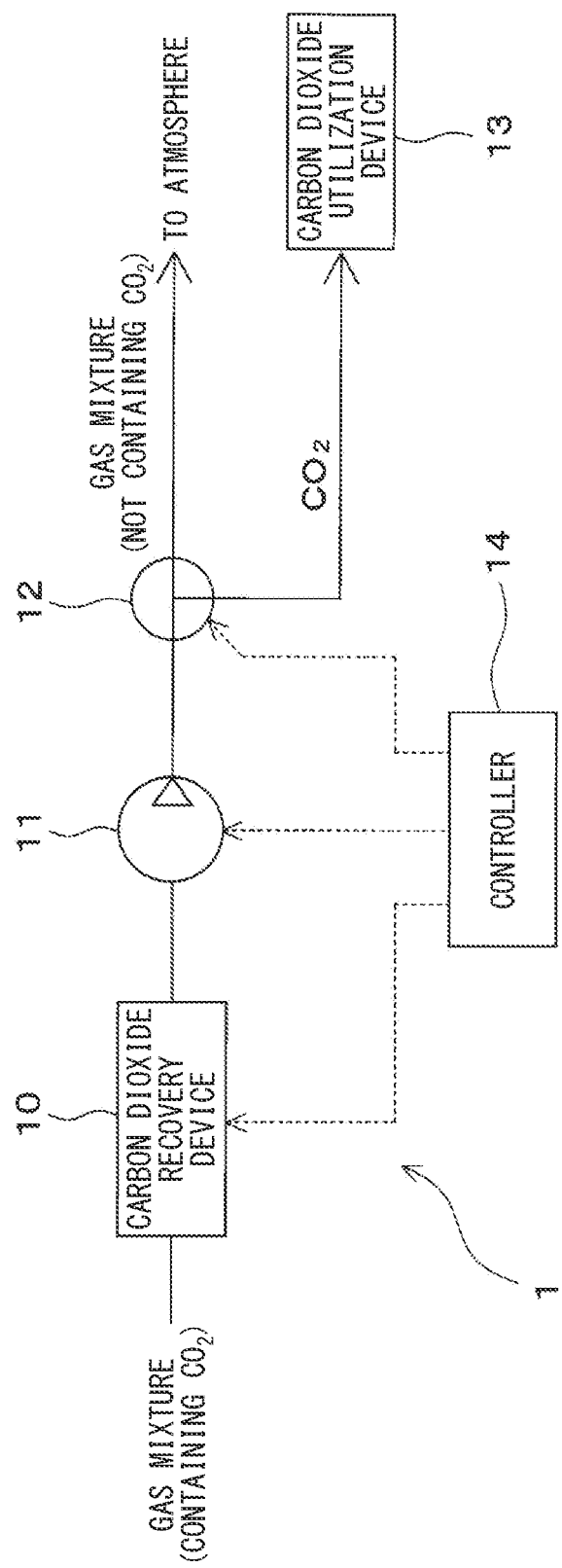
FIG. 1 is a conceptual diagram illustrating an overall configuration of a carbon dioxide recovery system according to a first embodiment.

A conventional device recovers (or capturers) carbon dioxide, which is a recovery target gas, from a mixed gas containing carbon dioxide. The device for recovering carbon dioxide includes an electrochemical cell that adsorbs carbon dioxide by causing an electrochemical reaction.

The electrochemical cell is formed as a stacked body including a working electrode, a counter electrode, a working-electrode current collector, a counter-electrode current collector, and the like, each of which is formed in a flat-plate shape and is stacked in the stacked body. The working electrode includes a carbon dioxide adsorbent that absorbs carbon dioxide from the mixed gas. The counter electrode includes an electroactive auxiliary material that exchanges electrons with the working electrode. The working-electrode current collector is an electrode in contact with the working electrode. The counter-electrode current collector is an electrode in contact with the counter electrode.

The carbon dioxide recovery device includes the electrochemical cells, which are stacked therein, and is configured to cause a mixed gas to flow through a passage formed between the electrochemical cells. The working electrode and the counter electrode, which are electrode films in the electrochemical cell, tend to warp because such a working electrode and a counter electrode each have a relatively large film thickness and a relatively low content rate of a metal-based component, as compared with a battery or the like.

The recovery amount of carbon dioxide in the carbon dioxide recovery device is therefore assumed to be affected by the width of the passage formed between the electrochemical cells. Accordingly, reduction in warpage and distortion of the electrochemical cell is considered to be meaningful, but no mention is made in the conventional art as to reduction in the warpage of the electrode film in the electrochemical cell.

The present disclosure provides a gas recovery system that can reduce a decrease in a capability to recover a recovery target gas by reducing warpage of an electrode film included in an electrochemical cell. The present disclosure provides a method of manufacturing an electrode film, so as to reduce warpage, regarding the electrode film of the electrochemical cell used in the gas recovery system.

According to a first aspect of the present disclosure, a gas recovery system configured to recover a recovery target gas from a mixed gas by causing an electrochemical reaction includes an electrochemical cell and a gas passage. The electrochemical cell has: a working electrode including an adsorbent configured to adsorb the recovery target gas; and a counter electrode configured to exchange electrons with the working electrode. Electron donation occurs from the counter electrode to the working electrode when a voltage is applied between the working electrode and the counter electrode. The adsorbent adsorbs the recovery target gas along with the electron donation. The gas passage is formed between the electrochemical cells provided in a stacked manner, so as to allow the mixed gas to flow through the gas passage.

At least one of the working electrode or the counter electrode includes an electrode film. The electrode film includes a plurality of regions having a size smaller than a size of the electrochemical cell. A reducing part that reduces warpage of the electrode film is adjacent to the plurality of regions.

According to the gas recovery system, the warpage in the electrode film can be reduced by causing the reducing part to be adjacent to the plurality of regions in the electrode film. With this configuration, the warpage of the electrochemical cell can be reduced, and thus the width of the gas passage provided between the electrochemical cells can be appropriately managed. The gas recovery system can therefore reduce a decrease in the capability to recover the recovery target gas due to change in the gas passage caused by the warpage of the electrochemical cell.

A method of manufacturing an electrode film is proposed, which is used in a gas recovery system configured to recover a recovery target gas from a mixed gas by causing an electrochemical reaction. The gas recovery system includes: an electrochemical cell including a working electrode including an adsorbent configured to adsorb the recovery target gas contained in the mixed gas, and a counter electrode configured to exchange electrons with the working electrode, electron donation occurring from the counter electrode to the working electrode when a voltage is applied between the working electrode and the counter electrode, the adsorbent adsorbing the recovery target gas along with the electron donation; and a gas passage formed between a plurality of the electrochemical cells provided in a stacked manner, the gas passage being configured to allow the mixed gas to flow through the gas passage.

The method of manufacturing the electrode film being included in at least one of the working electrode or the counter electrode includes: a mounting step of placing a masking member including a plurality of openings on a substrate; a coating step of applying a constituent material of the electrode film to the substrate and the masking member; an area forming step of forming a plurality of regions and a reducing part by removing the masking member after the coating step is completed, the plurality of regions having a size smaller than a size of the electrochemical cell, the reducing part being adjacent to the plurality of regions and reducing warpage of the electrode film; and a drying step of drying the constituent material of the electrode film applied on the substrate.

According to the method of manufacturing the electrode film used in the gas recovery system, the electrode film including the plurality of regions and the reducing part can be thus efficiently manufactured by performing the mounting step, the coating step, the area forming step, and the drying step. By using the electrode film manufactured through this manufacturing method, the warpage of the electrochemical cell can be reduced, and thus the width of the gas passage provided between the electrochemical cells can be appropriately managed. Therefore, according to the gas recovery system using the electrode film manufactured by this manufacturing method, reduction can be made in a decrease in the capability to recover the recovery target gas due to change in the gas passage caused by the warpage of the electrochemical cell.

Embodiments of the present disclosure will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

A first embodiment in the present disclosure will be described with reference to the drawings. In the first embodiment, a gas recovery system in the present disclosure is applied to a carbon dioxide recovery system 1 that separates and recovers carbon dioxide from a gas mixture containing carbon dioxide. A recovery target gas in the present embodiment is thus carbon dioxide.

As illustrated in FIG. 1, the carbon dioxide recovery system 1 according to the first embodiment includes a carbon dioxide recovery device 10, a pump 11, a passage switch valve 12, a carbon dioxide utilization device 13, and a controller 14.

The carbon dioxide recovery device 10 separates and recovers carbon dioxide from the gas mixture. The atmospheric air or an exhaust gas of an internal combustion engine can be used for the gas mixture. The gas mixture also contains a gas other than carbon dioxide. The gas mixture is supplied to the carbon dioxide recovery device 10. The carbon dioxide recovery device 10 discharges the gas mixture from which carbon dioxide has been removed, or the recovered carbon dioxide. A detailed configuration of the carbon dioxide recovery device 10 will be described later.

The carbon dioxide recovery device 10 has an outlet port to which a suction port side of the pump 11 is connected. The pump 11 sucks the gas mixture from which carbon dioxide has been removed, or the recovered carbon dioxide, from the carbon dioxide recovery device 10. The suction action of the pump 11 also causes the supply of the gas mixture to the carbon dioxide recovery device 10.

In the present embodiment, description is made for an example in which the pump 11 is disposed on the downstream side in the gas flow direction of the carbon dioxide recovery device 10. However, the pump 11 may be disposed on the upstream side in the gas flow direction of the carbon dioxide recovery device 10.

The pump 11 has a discharge port to which an inlet side of the passage switch valve 12 is connected. The passage switch valve 12 is a three-way valve that switches the passage for a gas flowing out of the carbon dioxide recovery device 10. The passage switch valve 12 has outlets, one of which is connected to the atmosphere side, and the other one of which is connected to the carbon dioxide utilization device 13. The passage switch valve 12 thus switches between a passage that allows the gas flowing out of the carbon dioxide recovery device 10 to flow out to the atmosphere side and a passage that allows the gas flowing out of the carbon dioxide recovery device 10 to flow out to the carbon dioxide utilization device 13.

The carbon dioxide utilization device 13 utilizes carbon dioxide. For the carbon dioxide utilization device 13, for example, a storage tank that stores carbon dioxide or a conversion device that converts carbon dioxide into fuel can be used. The conversion device converts carbon dioxide into a hydrocarbon fuel such as methane. The hydrocarbon fuel may be a fuel in a gas form at normal temperature and normal pressure, or may be a fuel in a liquid form at normal temperature and normal pressure.

The controller 14 includes a known microcomputer including a central processing unit (CPU), a read-only memory (ROM), a random access memory (RAM), and the like, and a peripheral circuit thereof. The controller 14 performs various calculations and processing on the basis of a control program stored in the ROM, and controls the operations of various control target devices connected to the output side of the controller 14. More specifically, the controller 14 according to the present embodiment controls the operations of the carbon dioxide recovery device 10, the pump 11, and the passage switch valve 12.

Figure 2:
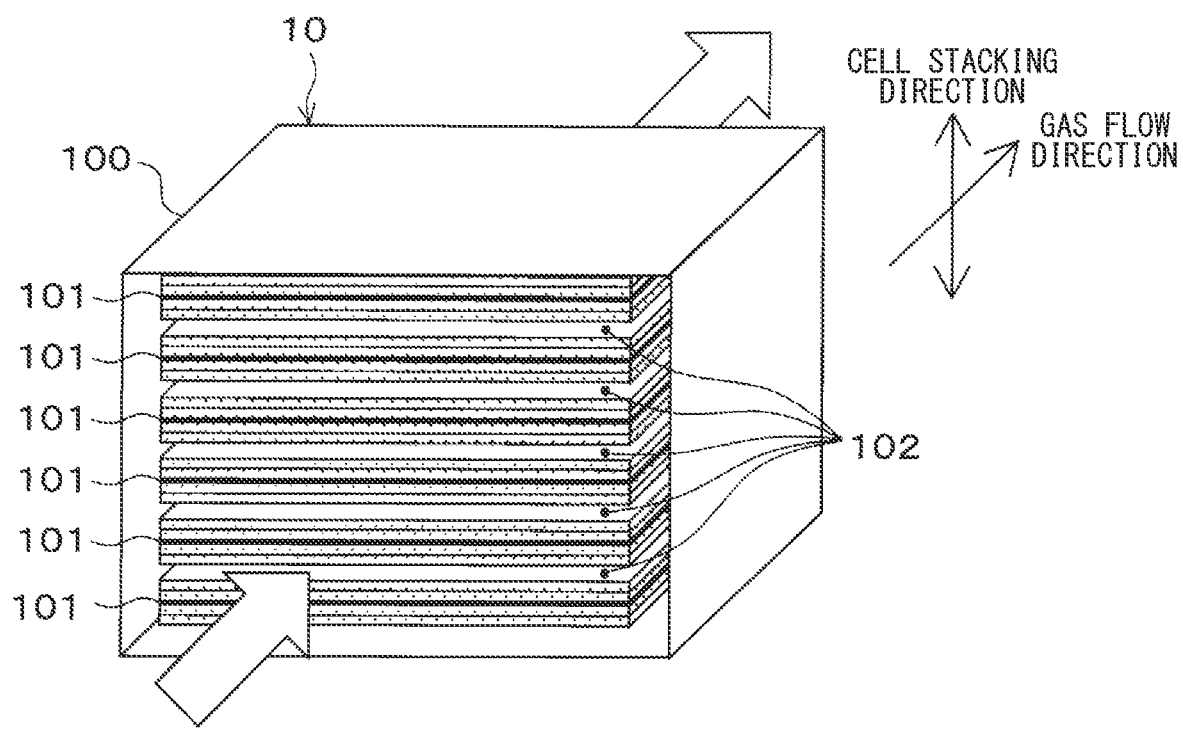
FIG. 2 is an explanatory view illustrating a configuration of a carbon dioxide recovery device.

Next, a configuration of the carbon dioxide recovery device 10 used in the carbon dioxide recovery system 1 will be described with reference to FIGS. 2 and 3. As illustrated in FIG. 2, the carbon dioxide recovery device 10 includes a housing 100 and electrochemical cells 101. The housing 100 according to the present embodiment is formed of a metal material. The housing 100 may be formed of a resin material.

In the housing 100, a gas inflow part and a gas outflow part are formed. The gas inflow part is an opening that allows the gas mixture to flow into the housing 100. The gas outflow part is an opening that allows the gas mixture from which carbon dioxide has been removed or the recovered carbon dioxide to flow out of the housing 100.

Each of the electrochemical cells 101 causes an electrochemical reaction to adsorb carbon dioxide, and thus separates and recovers the carbon dioxide from the gas mixture. Each of the electrochemical cells 101 causes an electrochemical reaction to desorb the adsorbed carbon dioxide, and thus releases the adsorbed carbon dioxide. The electrochemical cells 101 are housed in the housing 100.

Each of the electrochemical cells 101 is formed in a rectangular flat-plate shape. The electrochemical cells 101 are stacked at a regular interval such that plate surfaces thereof are parallel to one another inside the housing 100.

In between the electrochemical cells 101 adjacent to each other, a gas passage 102 is formed. The gas passage 102 allows the gas mixture flowing from the gas inflow part to flow therethrough. Thus, the flow direction of the gas mixture is parallel to the plate surface of the electrochemical cell 101, and is perpendicular to the stacking direction of the electrochemical cells 101.

Figure 3:
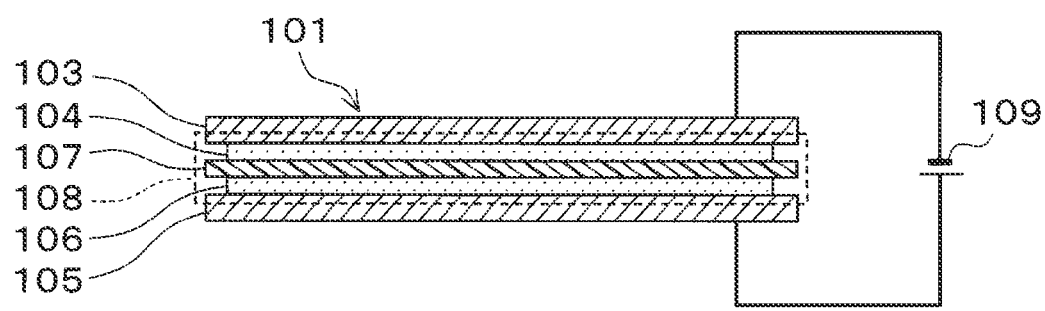
FIG. 3 is an explanatory view illustrating a configuration of an electrochemical cell in the carbon dioxide recovery device.

As illustrated in FIG. 3, the electrochemical cell 101 includes a working-electrode current collector 103, a working electrode 104, a counter-electrode current collector 105, a counter electrode 106, a separator 107, and an electrolyte layer 108. The working-electrode current collector 103, the working electrode 104, the counter-electrode current collector 105, the counter electrode 106, and the separator 107 are formed in respective rectangular flat-plate shapes.

The electrochemical cell 101 is formed as a stacked body including the working-electrode current collector 103, the working electrode 104, the counter-electrode current collector 105, the counter electrode 106, and the separator 107 that are stacked on top of one another. A stacking direction in which the working-electrode current collector 103 and the like are stacked in each electrochemical cell 101 coincides with a stacking direction in which the electrochemical cells 101 are stacked inside the housing 100.

The working-electrode current collector 103 is a conductive member that electrically connects the working electrode 104 and the counter electrode 106 by being in contact with the working electrode 104. The working-electrode current collector 103 has one flat surface, which is exposed to the gas mixture. The working-electrode current collector 103 has the other flat surface, which is in contact with the working electrode 104. In the working-electrode current collector 103, plural working-electrode opening portions (not illustrated) are formed to cause the gas mixture on the one flat surface side to be exposed to the working electrode 104 on the other flat surface side.

Specifically, the working-electrode current collector 103 according to the present embodiment is formed of a porous metal body. The working-electrode opening portions according to the present embodiment are thus formed by causing pores formed inside the working-electrode current collector 103 to communicate with one another. For the working-electrode current collector 103, a porous metal body having a porosity that is equal to or higher than 50% can be used. The porosity is defined as a ratio of the volume of pores to an apparent volume. For the working-electrode current collector 103, a carbon nonwoven fabric or the like may also be used.

The working electrode 104 can adsorb and recover carbon dioxide from the gas mixture, and can desorb and release the recovered carbon dioxide. The working electrode 104 includes a carbon dioxide adsorbent, a conductive assistant, and a binder. The working electrode 104 corresponds to an example of an electrode film 200. The carbon dioxide adsorbent, the conductive assistant, and the binder are used in a state of a mixture. More specifically, fine particles of the carbon dioxide adsorbent and fine particles of the conductive assistant are used in a state of being held by the binder.

The carbon dioxide adsorbent is an electroactive species that adsorbs carbon dioxide by receiving electrons and desorbs the adsorbed carbon dioxide by releasing electrons. For the carbon dioxide adsorbent, for example, a carbon material, a metal oxide, polyanthraquinone, or the like can be used.

The conductive assistant forms a conductive path to the carbon dioxide adsorbent. For the conductive assistant, for example, a carbon material such as carbon nanotube, carbon black, or graphene can be used.

The binder is a binding material that holds the carbon dioxide adsorbent and the conductive assistant. For the binder, for example, a high-molecular polymer conductive resin can be used. For the conductive resin, an organic material can be used, which is, for example, an epoxy resin containing Ag or the like as a conductive filler, a fluororesin such as polytetrafluoroethylene (PTFE) or polyvinylidene fluoride (PVDF), or the like.

The counter-electrode current collector 105 is a conductive member that electrically connects the working electrode 104 and the counter electrode 106 by being in contact with the counter electrode 106. The counter-electrode current collector 105 has one flat surface, which is exposed to the gas mixture. The counter-electrode current collector 105 has the other flat surface, which is in contact with the counter electrode 106. In the counter-electrode current collector 105, plural counter-electrode opening portions (not illustrated) are formed to cause the gas mixture on the one flat surface side to be exposed to the counter electrode 106 on the other flat surface side.

Specifically, the counter-electrode current collector 105 according to the present embodiment is formed of a porous metal body, similarly to the working-electrode current collector 103. The counter-electrode opening portions are thus formed by causing pores formed inside the counter-electrode current collector 105 to communicate with one another. For the counter-electrode current collector 105, a porous metal body having a porosity that is equal to or lower than 70% is desirably used.

The counter electrode 106 exchanges electrons with the working electrode 104, when the carbon dioxide adsorbent adsorbs or desorbs carbon dioxide. The counter electrode 106 includes an electroactive auxiliary material, a conductive assistant, and a binder. The electroactive auxiliary material, the conductive assistant, and the binder are used in a state of a mixture. More specifically, fine particles of the electroactive auxiliary material and fine particles of the conductive assistant are used in a state of being held by the binder, in the present embodiment.

The respective basic structures of the conductive assistant and the binder of the counter electrode 106 are similar to the respective basic structures of the conductive assistant and the binder of the working electrode 104. The electroactive auxiliary material is an auxiliary electroactive species that exchanges electrons with the carbon dioxide adsorbent of the working electrode 104, and is an active material that has an oxidation-reduction property. For the active material, an organic compound having a π bond, a transition metal compound having a plurality of oxidation numbers, or a metal complex capable of exchanging electrons by changing the valence of the metal ion can be used.

Such a metal complex can be, for example, a cyclopentadienyl metal complex such as ferrocene, nickelocene, or cobaltocene, a porphyrin metal complex, or the like. Each of these metal complexes may be a polymer or a monomer.

The separator 107 is disposed between the working electrode 104 and the counter electrode 106, and separates the working electrode 104 and the counter electrode 106. The separator 107 is an insulating ion-permeable membrane that enables avoidance of physical contact between the working electrode 104 and the counter electrode 106 to avoid an electrical short circuit, and that allows ions to permeate therethrough. For the separator 107, a cellulose membrane, a polymer, a composite material of a polymer and a ceramic, or the like can be used.

The electrolyte layer 108 is an immersion layer in which the working electrode 104, the separator 107, and the counter electrode 106 are immersed. For the electrolyte layer 108, for example, an ionic liquid can be used. An ionic liquid is a salt of a liquid having non-volatility at normal temperature and normal pressure.

A power source 109 is connected to the working-electrode current collector 103 and the counter-electrode current collector 105 of the electrochemical cell 101. The power source 109 can change a potential difference between the working electrode 104 and the counter electrode 106 by applying a predetermined voltage to the working electrode 104 and the counter electrode 106. The working electrode 104 is a negative electrode, and the counter electrode 106 is a positive electrode.

The electrochemical cell 101 operates in a carbon dioxide recovery mode and in a carbon dioxide release mode by changing a potential difference between the working electrode 104 and the counter electrode 106. The carbon dioxide recovery mode is a mode in which carbon dioxide is recovered at the working electrode 104. The carbon dioxide release mode is a mode in which carbon dioxide is released from the working electrode 104. The carbon dioxide recovery mode is a charge mode in which the electrochemical cell 101 is charged. The carbon dioxide release mode is a discharge mode in which the electrochemical cell 101 is discharged.

Specifically, in the carbon dioxide recovery mode, a first voltage V1 is applied between the working electrode 104 and the counter electrode 106, and electron donation occurs from the counter electrode 106 to the working electrode 104. At the first voltage V1, the working electrode potential is lower than the counter electrode potential. The first voltage V1 can be, for example, within a range of 0.5 to 2.0 V.

In the carbon dioxide release mode, a second voltage V2 is applied between the working electrode 104 and the counter electrode 106, and electron donation occurs from the working electrode 104 to the counter electrode 106. The second voltage V2 is a voltage different from the first voltage V1. The second voltage V2 is a voltage lower than the first voltage V1, and the magnitude relationship between the working electrode potential and the counter electrode potential is not limited. That is, in the carbon dioxide release mode, the working electrode potential may be lower than the counter electrode potential, the working electrode potential may be equal to the counter electrode potential, or the working electrode potential may be higher than the counter electrode potential.

Next, the operation of the carbon dioxide recovery system 1 will be described. As described above, the carbon dioxide recovery system 1 operates by alternately switching between the carbon dioxide recovery mode and the carbon dioxide release mode. The operation of the carbon dioxide recovery system 1 is controlled by the controller 14.

First, the operation of the carbon dioxide recovery system 1 in the carbon dioxide recovery mode will be described. In the carbon dioxide recovery mode, the pump 11 is operated. As a result, the gas mixture is supplied to the carbon dioxide recovery device 10. In the carbon dioxide recovery device 10, the voltage applied between the working electrode 104 and the counter electrode 106 of the electrochemical cell 101 is defined as the first voltage V1. As a result, simultaneous occurrence is achievable in electron donation at the electroactive auxiliary material of the counter electrode 106 and electron attraction at the carbon dioxide adsorbent of the working electrode 104.

The carbon dioxide adsorbent of the working electrode 104 that has received electrons from the counter electrode 106 increases its binding force for carbon dioxide, and binds and adsorbs carbon dioxide contained in the gas mixture.

The carbon dioxide recovery device 10 can thus recover carbon dioxide from the gas mixture. The gas mixture from which carbon dioxide has been removed is discharged from the carbon dioxide recovery device 10.

In the carbon dioxide recovery mode, the passage switch valve 12 switches the passage to the passage that allows the gas mixture discharged from the carbon dioxide recovery device 10 to flow out to the atmosphere side. As a result, the gas mixture discharged from the carbon dioxide recovery device 10 is discharged to the atmosphere.

Next, the operation of the carbon dioxide recovery system 1 in the carbon dioxide release mode will be described. In the carbon dioxide release mode, the pump 11 is stopped. As a result, the supply of the gas mixture to the carbon dioxide recovery device 10 is stopped. In the carbon dioxide recovery device 10, the voltage applied between the working electrode 104 and the counter electrode 106 of the electrochemical cell 101 is defined as the second voltage V2. As a result, simultaneously occurrence is achievable in electron donation at the carbon dioxide adsorbent of the working electrode 104 and electron attraction at the electroactive auxiliary material of the counter electrode 106.

The carbon dioxide adsorbent of the working electrode 104 releases electrons to be in an oxidation state. The carbon dioxide adsorbent decreases its binding force for carbon dioxide, and desorbs and releases carbon dioxide. The carbon dioxide released from the carbon dioxide adsorbent is discharged from the carbon dioxide recovery device 10.

In the carbon dioxide release mode, the passage switch valve 12 switches the passage to allow the carbon dioxide discharged from the carbon dioxide recovery device 10 to flow out to an inlet port side of the carbon dioxide utilization device 13. As a result, the carbon dioxide discharged from the carbon dioxide recovery device 10 is supplied to the carbon dioxide utilization device 13.

As described above, according to the carbon dioxide recovery system 1 in the present embodiment, carbon dioxide can be recovered from the gas mixture, and the recovered carbon dioxide can be effectively used.

In the carbon dioxide recovery device 10 configured as described above, carbon dioxide is adsorbed from the gas mixture by the carbon dioxide adsorbent of the working electrode 104, when the gas mixture flows through the gas passages 102 between the stacked electrochemical cells 101. The capability of the carbon dioxide recovery device 10 for recovering carbon dioxide is thus strongly affected by the flow of the gas mixture in each gas passage 102 (that is, the passage shape of the gas passage 102).

As described above, the gas passages 102 are formed between the stacked electrochemical cells 101. A factor that changes the passage shape of the gas passage 102 is thus considered to be warpage or distortion of the electrochemical cell 101.

In the first embodiment, as a configuration that reduces warpage and distortion of the electrochemical cell 101, a configuration is used in which the working electrode 104 and the counter electrode 106, each of which is an electrode film 200, each are divided into a plurality of regions 110 and a reducing part (warpage reducing part) 120 is caused to be adjacent to corresponding regions 110.

A method of manufacturing an electrochemical cell 101 including the electrode film 200 (each of the working electrode 104 and the counter electrode 106) including the plurality of regions 110 and the reducing part 120 will be described with reference to FIGS. 4A to 4C. The method of manufacturing the electrochemical cell 101 includes a manufacturing process of an electrode film 200 forming the working electrode 104 and a manufacturing process of an electrode film 200 forming the counter electrode 106. The manufacturing process of the electrode film 200 forming the working electrode 104 and the manufacturing process of the electrode film 200 forming the counter electrode 106 are basically identical, and can be separately performed.

Figure 4A:
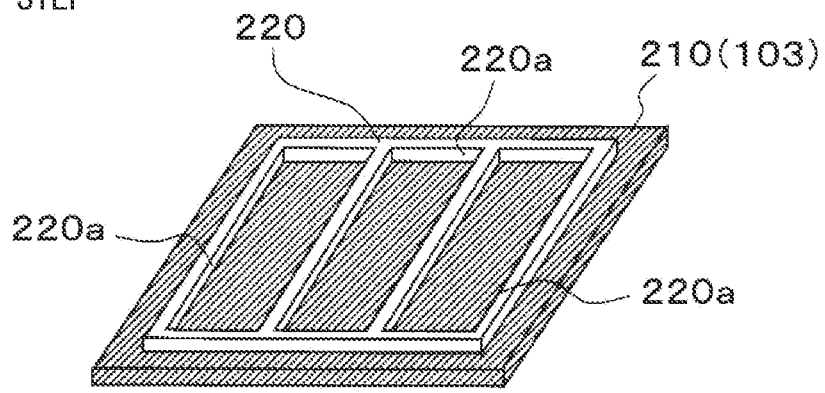
FIG. 4A is an explanatory view illustrating a mounting step to manufacture an electrode film used in the carbon dioxide recovery system according to the first embodiment.
Figure 4B:
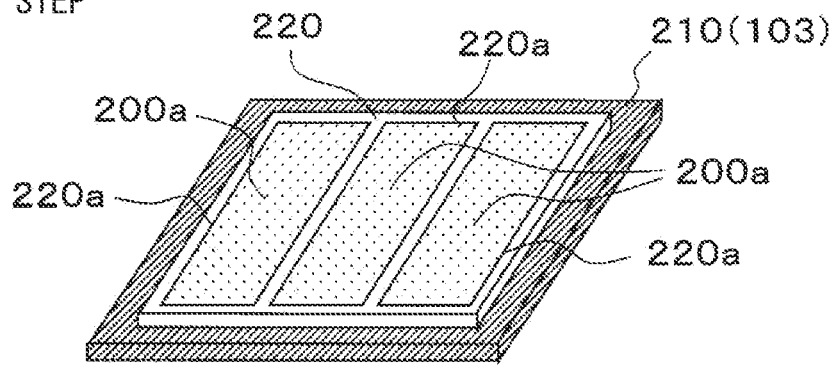
FIG. 4B is an explanatory view illustrating a coating step to manufacture an electrode film used in the carbon dioxide recovery system according to the first embodiment.
Figure 4C:
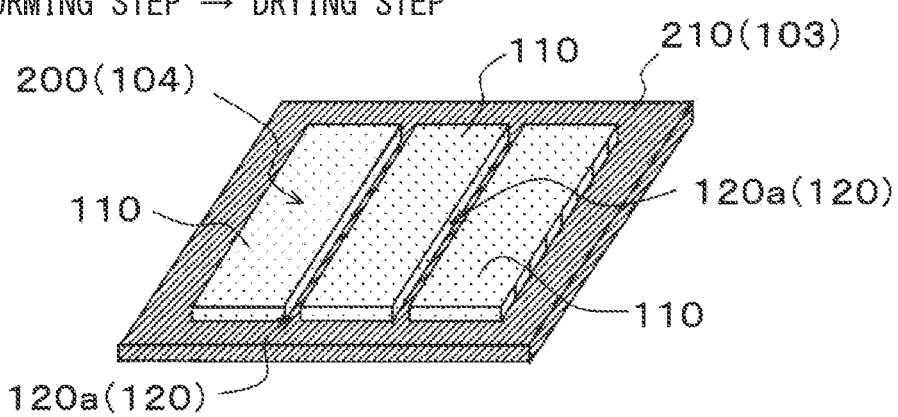
FIG. 4C is an explanatory view illustrating an area forming step to manufacture an electrode film used in the carbon dioxide recovery system according to the first embodiment.

In FIGS. 4A to 4C, a method of manufacturing the electrode film 200 forming the working electrode 104 will be described. In the description for FIGS. 4A to 4C, the working-electrode current collector 103 is used as a substrate 210 when the electrode film 200 related to the working electrode 104 is manufactured. The substrate 210 in this case may be a flat-plate-shaped member having a flat surface. For example, the separator 107 can be used as the substrate 210, as described later.

As illustrated in FIGS. 4A to 4C, in the manufacturing process of the electrode film 200 related to the working electrode 104, a mounting step, a coating step, an area forming step, and a drying step are performed. In the mounting step, a masking member 220 having region formation openings 220a is placed on one surface of the working-electrode current collector 103, which is the substrate 210. In the masking member 220, the region formation openings 220a are formed such that each opening area is smaller than the size of the electrochemical cell 101.

Placement of the masking member 220 creates two types of portions on the one surface of the working-electrode current collector 103. One type portion includes portions in each of which the surface of the working-electrode current collector 103 is exposed (for example, portions corresponding to the respective region formation openings 220a). The other type portion is a portion covered with the masking member 220.

When the mounting step is completed, the coating step is performed. In the coating step, a paste 200a, which is a member forming the electrode film 200, is applied over the working-electrode current collector 103 as the substrate 210 and the masking member 220 placed on the substrate 210. The paste 200a in this case is formed into a paste form by mixing the constituent materials of the working electrode 104 such as the carbon dioxide adsorbent, the conductive assistant, and the binder. As a result, the region formation openings 220a formed in the masking member 220 is filled with the respective pastes 200a, and the pastes 200a are applied on the one surface side of the working-electrode current collector 103.

When the coating step is completed, the area forming step is performed. In the area forming step, the masking member 220 is lifted upward and removed from the working-electrode current collector 103 having undergone the coating step. As a result, the pastes 200a with which the region formation openings 220a has been filled remain on the one surface of the working-electrode current collector 103. An electrode film 200 including a plurality of regions 110 is thus formed.

In the area forming step, the removal of the masking member 220 forms dividing clearances 120a adjacent to the plurality of regions 110. Each of the dividing clearances 120a is a line in which the paste 200a is not applied on the surface of the working-electrode current collector 103, and is formed as the reducing part 120. The dividing clearances 120a are formed along opening edges of the region formation openings 220a in the masking member 220. In the first embodiment, the number of dividing clearances 120a is plural, and the dividing clearances 120a are formed in a linear shape extending along a predetermined direction.

In the drying step, the pastes 200a applied on the one surface of the working-electrode current collector 103 are dried and cured. As a result, the working electrode 104 formed of the electrode film 200 including the plurality of regions 110 and the dividing clearances 120a is formed on the one surface of the working-electrode current collector 103.

In the drying step, the substrate 210 and the paste 200a on the substrate 210 may be heated to increase the drying rate. The drying step may be performed in a plurality of stages. For example, a primary drying step may be additionally performed before the area forming step to advance the drying stage of the paste 200a, thereby improving the accuracy in removing the masking member 220 in the area forming step.

With the above steps, the working electrode 104 formed of the electrode film 200 is formed on the one surface side of the working-electrode current collector 103, in the manufacturing process of the electrode film 200 related to the working electrode 104.

In this regard, also in the manufacturing process of the electrode film 200 related to the counter electrode 106, the mounting step, the coating step, the area forming step, and the drying step are performed. As a result, the counter electrode 106 formed of the electrode film 200 is formed on one surface side of the counter-electrode current collector 105. Note that the paste 200a used in the coating step in this case is formed into a paste form by mixing the constituent materials of the counter electrode 106, and includes the electroactive auxiliary material, the conductive assistant, and the binder.

Thereafter, a bonding step is performed. In the bonding step, the working-electrode current collector 103 and the working electrode 104 manufactured in the manufacturing process of the electrode film 200 related to the working electrode 104, and the counter-electrode current collector 105 and the counter electrode 106 manufactured in the manufacturing process of the electrode film 200 related to the counter electrode 106 are bonded, with the separator 107 interposed therebetween. When the bonding step is performed, an electrolyte solution is added dropwise in advance to each of a set of the working-electrode current collector 103 and the working electrode 104, and a set of the counter-electrode current collector 105 and the counter electrode 106, thereby causing the electrolyte solution to permeate therethrough. In the bonding step, as is apparent from FIGS. 3 and 6, a surface on the side of the counter electrode 106 and a surface on the side of the working electrode 104 are bonded to the separator 107 to come into contact with the separator 107.

Thereafter, the power source 109 is connected to the working-electrode current collector 103 and the counter-electrode current collector 105. As a result, the electrochemical cell 101 is manufactured.

In the electrode film 200 manufactured as described above, the reducing part 120 formed as the dividing clearance 120a is adjacent to the plurality of regions 110. Warpage of the electrode film 200 can be thus reduced. The number and arrangement of the plurality of regions 110 and the dividing clearances 120a in the electrode film are determined such that the warpage of the electrode film 200 is equal to or less than 1 mm.

Figure 5:
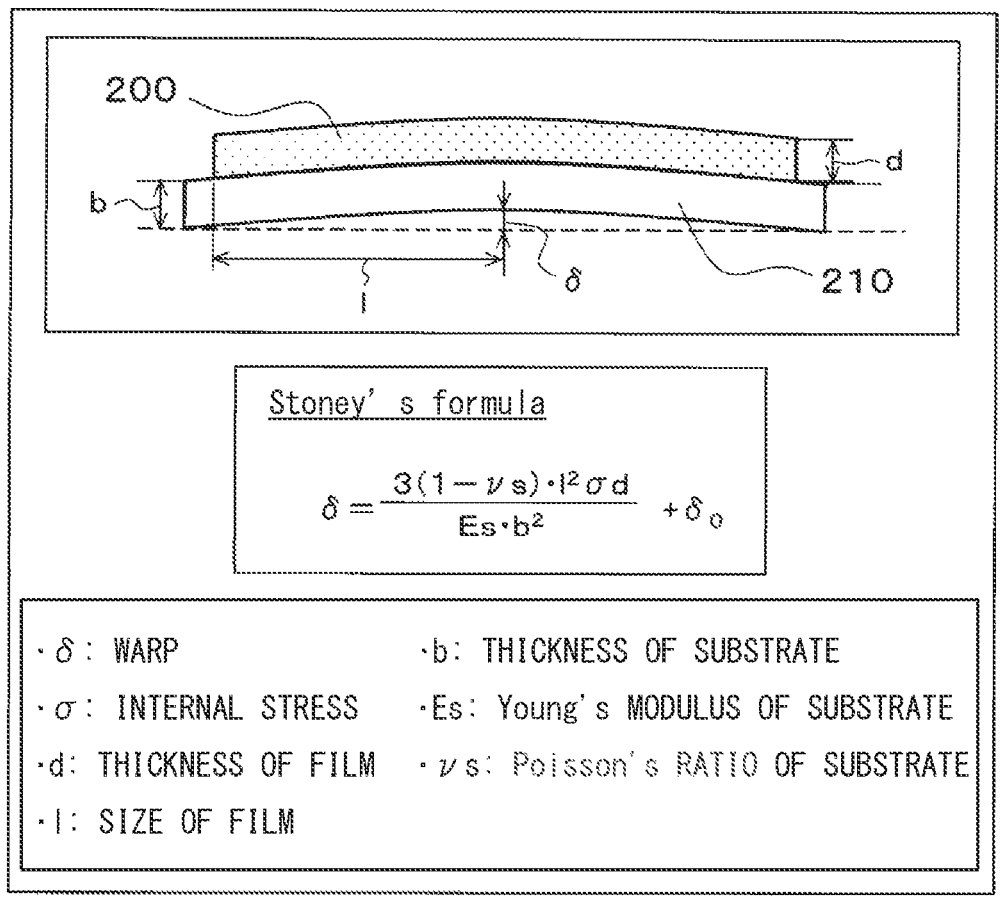
FIG. 5 is an explanatory diagram related to warpage in the electrode film and a substrate.

Here, the warpage of the electrode film 200 is defined by the Stoney equation illustrated in FIG. 5. When the warpage of the electrode film 200 is expressed by the Stoney equation as a function of a stress and a coating size of the electrode film 200, the warpage of the electrode film 200 is proportional to the square of the coating size I of the electrode film 200, and the first power of the internal stress σ of the electrode film 200 and a thickness d of the electrode film 200. The warpage of the electrode film 200 is proportional to the negative first power of a Young's modulus Es of the substrate 210, and the negative square of a thickness b of the substrate 210.

The electrode film 200 used in the electrochemical cell 101 is mainly formed of carbon. The internal stress σ of the electrode film 200 thus tends to increase. The thickness d of the electrode film 200 has a value higher than the value in an electrode used in a battery. The working-electrode current collector 103 or the like used as the substrate 210 is provided with the working-electrode opening portions or the like for allowing the gas mixture to permeate therethrough. The working-electrode current collector 103 or the like thus tends to be low in rigidity as the substrate 210, and therefore the effective Young's modulus (that is, the Young's modulus Es of the substrate 210) also tends to be low.

Accordingly, in view of various conditions related to the electrode film 200 used in the electrochemical cell 101, imposition of limitation on the coating size I of the electrode film 200 is found to be greatly effective, in order to reduce the warpage of the electrode film 200.

In the first embodiment, the coating size I can be sufficiently limited because the electrode film 200 is divided into the plurality of regions 110 by the dividing clearances 120a, which also serve as the gas passages 102. As a result, the electrochemical cell 101 according to the first embodiment has a configuration in which the warpage can be reduced and the width of the gas passage 102 can be thus appropriately managed.

A configuration example of the electrochemical cell 101 including the electrode film 200 manufactured by the method of manufacturing the electrode film 200 according to the first embodiment will be described with reference to FIG. 6.

As illustrated in FIGS. 4A to 4C, the electrode film 200 (each of the working electrode 104 and the counter electrode 106) including the three regions 110 is formed on the one surface of the substrate 210 (each of the working-electrode current collector 103 and the counter-electrode current collector 105), in the method of manufacturing the electrode film 200 according to the first embodiment. The dividing clearances 120a as the reducing parts 120 are formed between the plurality of regions 110. The dividing clearances 120a extend linearly along a predetermined direction.

Figure 6:
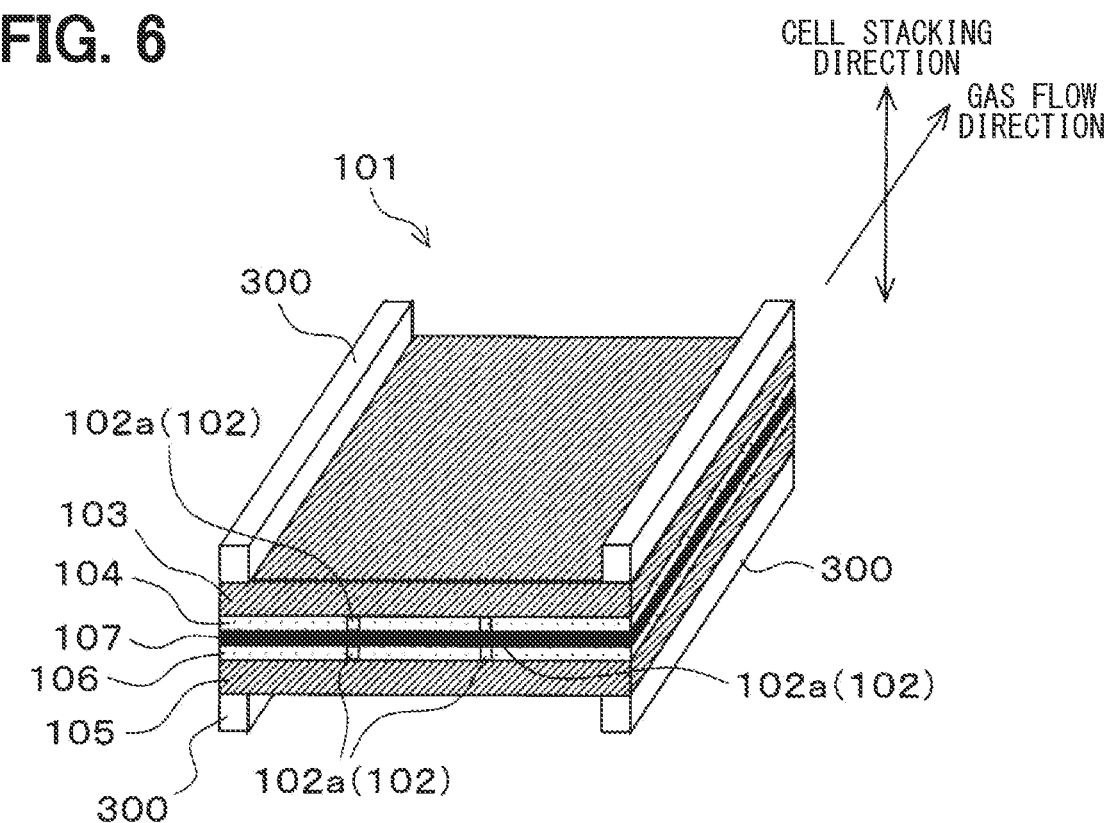
FIG. 6 is a schematic view illustrating a configuration example of the electrochemical cell according to the first embodiment.

In the configuration example illustrated in FIG. 6, bonding is made such that the dividing clearance 120a on the side of the working electrode 104 and the dividing clearance 120a on the side of the counter electrode 106 extend in the same direction, when the surface on the side of the counter electrode 106 and the surface on the side of the working electrode 104 are bonded to the separator 107 to come into contact with the separator 107, in the bonding step described above.

Spacers 300 for forming the gas passage 102 are then disposed on the electrochemical cell 101 having undergone the bonding step. As illustrated in FIG. 6, the spacers 300 are disposed in a manner continuous in the same direction as the direction along which the dividing clearances 120a extend, at edges of the electrochemical cell 101.

Figure 7:
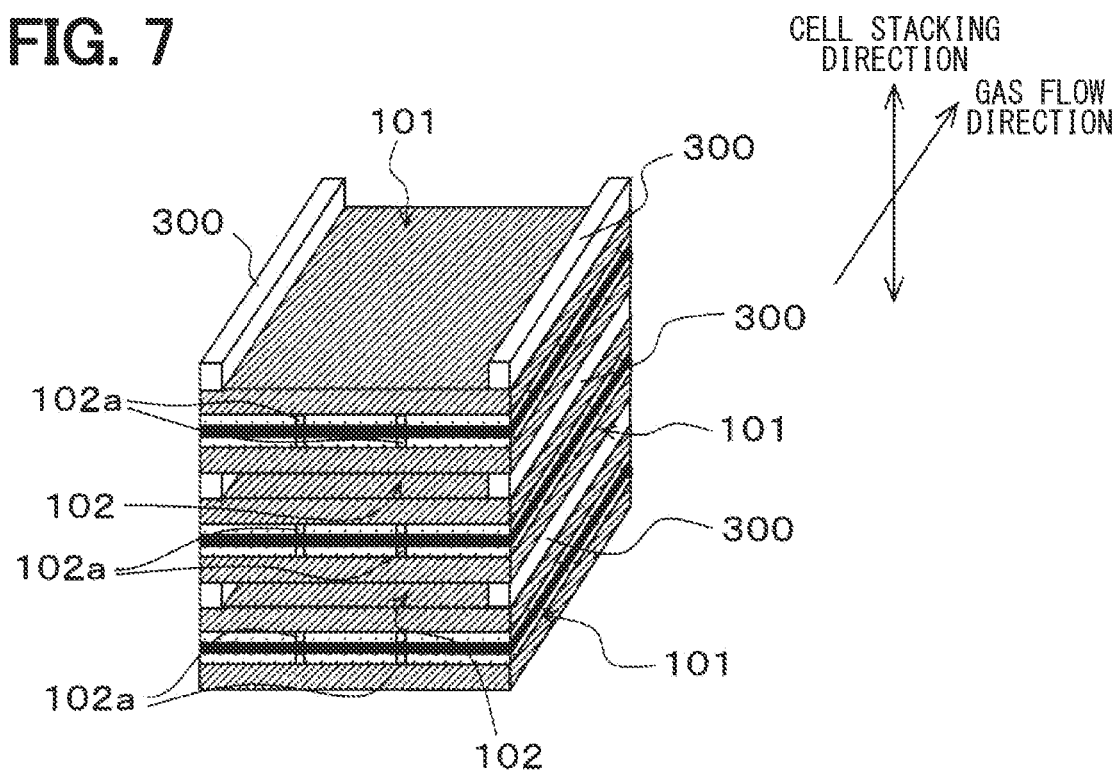
FIG. 7 is a schematic view illustrating a configuration example of the carbon dioxide recovery device according to the first embodiment.

The electrochemical cells 101 configured as illustrated in FIG. 6 is stacked inside the housing 100 to form the carbon dioxide recovery device 10 illustrated in FIG. 7. At this time, a stacked body, which is formed of the electrochemical cells 101, is disposed such that each dividing clearance 120a in the electrochemical cells 101 coincides with the gas flow direction in the carbon dioxide recovery device 10.

With such a configuration, warpage of the electrochemical cell 101 related to the direction intersecting the gas flow direction can be reduced by providing each dividing clearance 120a. Warpage of the electrochemical cell 101 related to the gas flow direction can be reduced by the spacer 300 continuous in the direction coincident with the gas flow direction at the edge of the electrochemical cell 101. Thus, according to the carbon dioxide recovery device 10 illustrated in FIG. 7, reduction can be made in a decrease in the capability to recover the recovery target gas due to change in the gas passage caused by the warpage of the electrochemical cell.

When the electrode film 200 divided into the plurality of regions 110 by the dividing clearances 120a extending in a predetermined direction is manufactured, various manufacturing methods can be used, in addition to the aspect in which the masking member 220 described above is used. For example, a continuous shaping process such as roll shaping may be used to manufacture the electrode film 200 divided into the plurality of regions 110 by shaping the dividing clearances 120a extending in a predetermined direction.

As described above, according to the carbon dioxide recovery system 1 in accordance with the first embodiment, the plurality of regions 110 is formed in the electrode film 200 forming each of the working electrode 104 and the counter electrode 106, and the reducing part 120 can be made adjacent to each of the plurality of regions 110, in the electrochemical cell 101. By forming the plurality of regions 110 having a size smaller than the size of the electrochemical cell 101 and forming the reducing part 120, the warpage of the electrode film 200 in the electrochemical cell 101 can be reduced.

As a result, the warpage of the electrochemical cell 101 can be reduced, and thus the width of the gas passage 102 provided between the electrochemical cells 101 can be appropriately managed. The carbon dioxide recovery system 1 can therefore reduce a decrease in the capability to recover the recovery target gas due to change in the gas passage 102 caused by the warpage of the electrochemical cell 101.

As illustrated in FIGS. 4A to 4C, 6, and 7, the reducing part 120 includes the dividing clearance 120a that divides the electrode film 200 into the plurality of regions 110, in the carbon dioxide recovery system 1 according to the first embodiment. By the division into the plurality of regions 110 using the dividing clearance 120a, the coating size I of the electrode film 200 can be reliably reduced, and thus the warpage of the electrode film 200 can be effectively reduced.

As illustrated in FIGS. 6 and 7, the electrochemical cell 101 is disposed such that the dividing clearance 120a as the reducing part 120 extends along the gas flow direction, in the carbon dioxide recovery device 10. As a result, the warpage of the electrochemical cell 101 related to the direction intersecting the gas flow direction can be reduced. Thus, the width of the gas passage 102 can be maintained, and a decrease in the capability to recover carbon dioxide, which is the recovery target gas, can be reduced.

As illustrated in FIGS. 4A to 4C, according to the method of manufacturing the electrode film 200 in accordance with the first embodiment, the electrode film 200 including the plurality of regions 110 and the reducing part 120 can be efficiently manufactured by performing the mounting step, the coating step, the area forming step, and the drying step, using the masking member 220.

By using the electrode film 200 manufactured through this manufacturing method, the warpage of the electrochemical cell 101 can be reduced, and thus the width of the gas passage 102 between the electrochemical cells 101 can be appropriately managed. Therefore, according to the carbon dioxide recovery system 1 using the electrode film 200 manufactured by this manufacturing method, reduction can be made in a decrease in the capability to recover the recovery target gas due to change in the gas passage 102 caused by the warpage of the electrochemical cell 101.

Second Embodiment

Next, a second embodiment different from the above embodiment will be described with reference to FIGS. 8A to 8C. The second embodiment is different from the first embodiment in the method of manufacturing the electrode film 200 forming each of the working electrode 104 and the counter electrode 106, and in the configuration of the reducing part 120. Other basic configurations and the like are similar to those of the above embodiment, and thus repeated description thereof will be omitted.

Figure 8A:
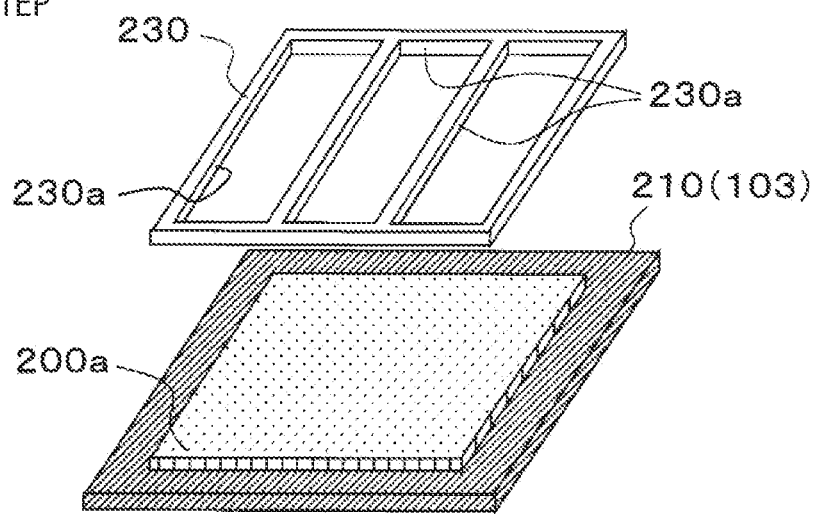
FIG. 8A is an explanatory view illustrating a coating step in a method of manufacturing an electrode film according to a second embodiment.
Figure 8B:
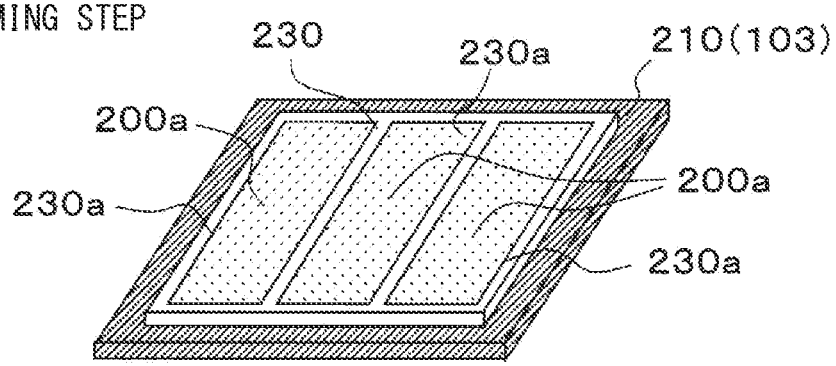
FIG. 8B is an explanatory view illustrating an area forming step in a method of manufacturing an electrode film according to the second embodiment.
Figure 8C:
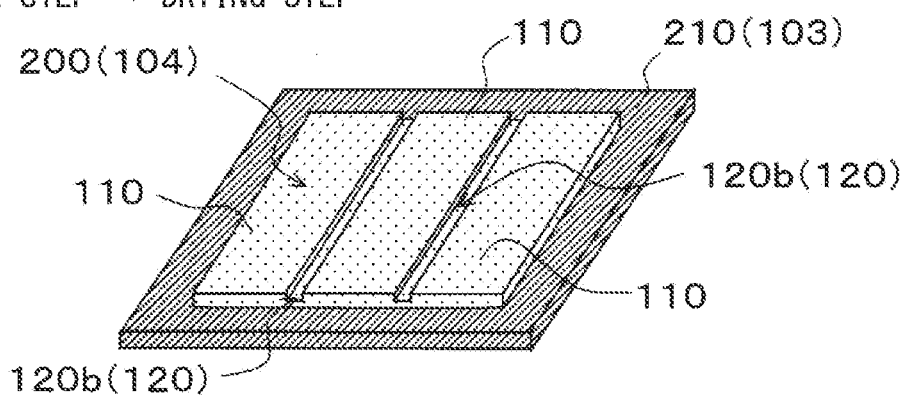
FIG. 8C is an explanatory view illustrating a removal step in a method of manufacturing an electrode film according to the second embodiment.

In the description of FIGS. 8A to 8C, similarly to the first embodiment, a method of manufacturing an electrode film 200 forming the working electrode 104 will be described, and the working-electrode current collector 103 is used as the substrate 210.

As illustrated in FIGS. 8A to 8C, in the method of manufacturing the electrode film 200 according to the second embodiment, a coating step, an area forming step, a removal step, and a drying step are performed. In the method of manufacturing the electrode film 200 according to the second embodiment, a delimiting groove 120b, which is a line formed as the reducing part 120, is formed in the electrode film 200. The delimiting groove 120b delimits a plurality of regions 110.

Specifically, in the coating step in the second embodiment, a paste 200a, which is a member forming the electrode film 200, is applied on a predetermined formation range of the electrode film 200 on one surface of the working-electrode current collector 103, which is the substrate 210. The paste 200a in this case is formed into a paste form by mixing constituent materials of the working electrode 104 such as the carbon dioxide adsorbent, the conductive assistant, and the binder.

In the method of manufacturing the electrode film 200 according to the second embodiment, the area forming step is performed when the coating step is completed. In the area forming step according to the second embodiment, a reducing-part formation member 230 including a plurality of region formation openings 230a is used to form the plurality of regions 110 and the delimiting grooves 120b as the reducing parts 120 in the applied paste 200a. In the reducing-part formation member 230, the plurality of region formation openings 230a is formed such that each opening area is smaller than the size of the electrochemical cell 101.

Specifically, in the area forming step, the reducing-part formation member 230 is pressed against the paste 200a applied on the one surface of the working-electrode current collector 103, and a pressure is applied to the paste 200a such that the reducing-part formation member 230 approaches the one surface of the working-electrode current collector 103.

As a result, a step is formed in the paste 200a between portions in contact with the reducing-part formation member 230 and portions not in contact with the reducing-part formation member 230 (for example, portions corresponding to the region formation openings 230a). As illustrated in FIGS. 8A to 8C, the linear groove-like delimiting grooves 120b are formed in the portions in contact with the reducing-part formation member 230 because the thickness of the paste 200a is reduced by the pressure.

In contrast, no pressure acts on the portions of the paste 200a inside the region formation openings 230a, even when the reducing-part formation member 230 is pressed. Thus, the plurality of regions 110 in the electrode film 200 is formed inside the respective region formation openings 230a in a state where the plurality of regions 110 has a size smaller than the size of the electrochemical cell 101.

By performing the area forming step using the reducing-part formation member 230, the groove-like delimiting groove 120b adjacent to the corresponding regions 110 can be formed as the reducing part 120, in addition to the formation of the plurality of regions 110 having a size smaller than the size of the electrochemical cell 101.

When the area forming step is completed, the removal step is performed. In the removal step, an excess portion of the paste 200a that has protruded is removed when the reducing-part formation member 230 is pressed against the paste 200a in the area forming step. The removal step can also be referred to as a shaping step of adjusting the shapes of the regions 110 and the delimiting grooves 120b in the electrode film 200 after the area forming step in the second embodiment is completed.

In the drying step, the paste 200a applied on the one surface of the working-electrode current collector 103 is dried and cured. As a result, the working electrode 104 formed of the electrode film 200 including the plurality of regions 110 and the delimiting grooves 120b is formed on the one surface of the working-electrode current collector 103.

The drying step may be performed in a plurality of stages. For example, a primary drying step may be additionally performed after the coating step and before the area forming step to advance the drying stage of the paste 200a. With this step, a deformation amount of the paste 200a can be adjusted which is generated when the reducing-part formation member 230 is pressed against the paste 200a in the area forming step. Shaping accuracy can be thus improved in each of the region 110 and the delimiting groove 120b.

With the above steps, the working electrode 104 formed of the electrode film 200 including the plurality of regions 110 and the delimiting grooves 120b is formed on the one surface side of the working-electrode current collector 103, by the manufacturing method according to the second embodiment.

Also in the second embodiment, as the manufacturing process of the electrode film 200 related to the counter electrode 106, the coating step, the area forming step, the removal step, and the drying step are performed. As a result, the counter electrode 106 including the plurality of regions 110 and the delimiting grooves 120b is formed on one surface side of the counter-electrode current collector 105. Note that the paste 200a used in the coating step in this case is formed into a paste form by mixing the constituent materials of the counter electrode 106, and includes the electroactive auxiliary material, the conductive assistant, and the binder.

In a carbon dioxide recovery system 1 according to the second embodiment, the delimiting groove 120b, which is formed as a linearly extending groove, is formed, as the reducing part 120 of the electrode film 200 used in the carbon dioxide recovery system 1.

The delimiting groove 120b is formed in a groove-like shape having a thickness thinner than the thickness of the adjacent regions 110 in terms of the thickness of the electrode film 200. That is, the delimiting groove 120b and the adjacent regions 110 are integrated, and thus the effect of reducing the warpage of the electrode film 200 is limitative as compared with the effect brought by the dividing clearance 120a in the first embodiment. However, in view of easiness in segmentation regarding the plurality of regions 110 and securing of the basis weight, the delimiting groove 120b can be used as the reducing part 120.

As described above, according to the carbon dioxide recovery system 1 in accordance with the second embodiment, the operation and effect achieved from the configuration and operation common to those of the above embodiment can be obtained, even when the electrode film 200 is delimited into the plurality of regions 110 by the groove-like delimiting groove 120b.

According to the method of manufacturing the electrode film 200 in accordance with the second embodiment, the electrode film 200 including the plurality of regions 110 and the reducing part 120 can be efficiently manufactured by performing the coating step, the area forming step, the removal step, and the drying step, using the reducing-part formation member 230.

By using the electrode film 200 manufactured through this manufacturing method, the warpage of the electrochemical cell 101 can be reduced, and thus the width of the gas passage 102 between the electrochemical cells 101 can be appropriately managed. Therefore, according to the carbon dioxide recovery system 1 using the electrode film 200 manufactured by this manufacturing method, reduction can be made in a decrease in the capability to recover the recovery target gas due to change in the gas passage 102 caused by the warpage of the electrochemical cell 101.

Third Embodiment

Next, a third embodiment different from the above embodiments will be described with reference to FIGS. 9A to 9C. The third embodiment is different from the above embodiments in the method of manufacturing the electrode film 200 forming each of the working electrode 104 and the counter electrode 106. Other basic configurations and the like are similar to those of the above embodiments, and thus repeated description thereof will be omitted.

Figure 9A:
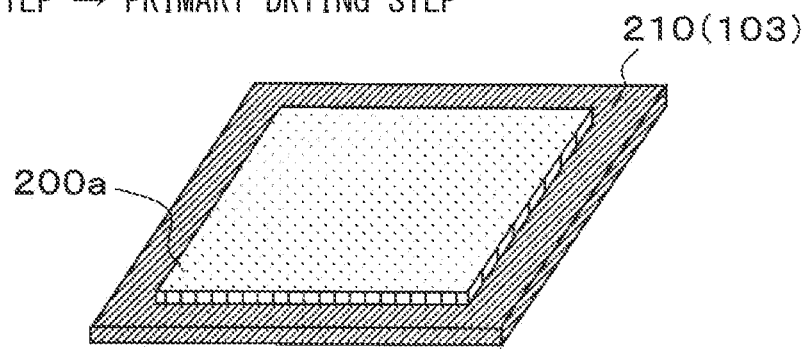
FIG. 9A is an explanatory view illustrating a coating step in a method of manufacturing an electrode film according to a third embodiment.
Figure 9B:
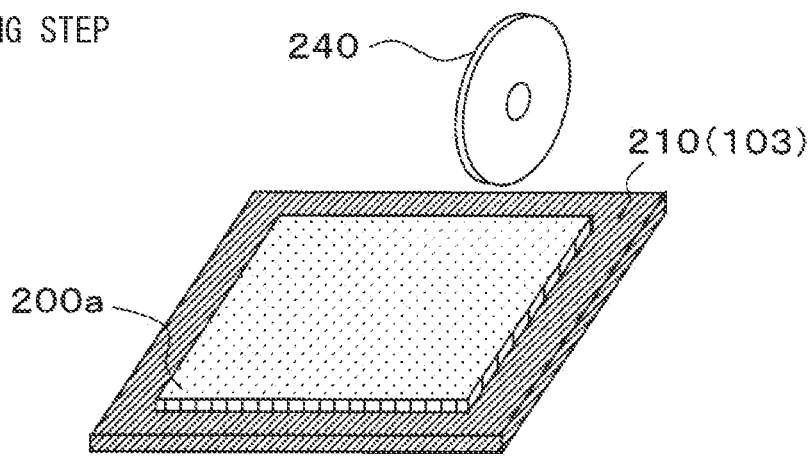
FIG. 9B is an explanatory view illustrating a separating step in a method of manufacturing an electrode film according to the third embodiment.
Figure 9C:
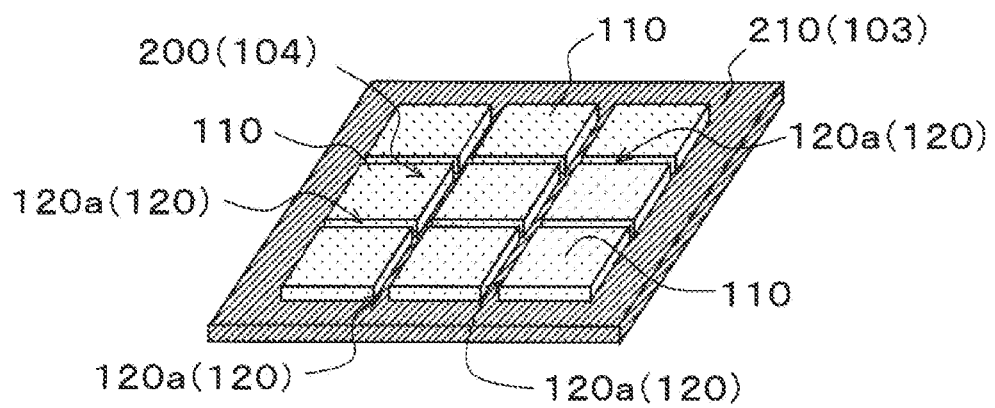
FIG. 9C is an explanatory view illustrating a drying step in a method of manufacturing an electrode film according to the third embodiment.

In the description of FIGS. 9A to 9C, similarly to the above embodiments, a method of manufacturing an electrode film 200 forming the working electrode 104 will be described, and the working-electrode current collector 103 is used as the substrate 210.

As illustrated in FIGS. 9A to 9C, in the method of manufacturing the electrode film 200 according to the third embodiment, a coating step, a primary drying step, a separating step, and a drying step are performed. In the method of manufacturing the electrode film 200 according to the third embodiment, dividing clearances 120a are formed as the reducing parts 120 in the electrode film 200 with a removal device 240, and the dividing clearances 120a divide the electrode film 200 into a plurality of regions 110.

Specifically, in the coating step in the third embodiment, similarly to the second embodiment, a paste 200a, which is a member forming the electrode film 200, is applied on a predetermined formation range of the electrode film 200 on one surface of the working-electrode current collector 103, which is the substrate 210.

When the coating step according to the third embodiment is completed, the primary drying step is performed. The primary drying step is a step of promoting the dryness degree of the paste 200a applied on the substrate 210 to such a degree that portions of the paste 200a can be removed with the removal device 240 in the separating step described later.

When the primary drying step is completed, the separating step is performed. The separating step in the third embodiment is a step of delimiting the paste 200a into the plurality of regions 110 by removing the portions of the paste 200a dried to a predetermined dryness degree from the substrate 210 with the removal device 240.

For the removal device 240, various devices can be used as long as the portions of the paste 200a applied on the substrate 210 can be removed. For example, as an example of the removal device 240, a grinder, a sander, or the like can be used to perform the separating step by machining.

In the separating step illustrated in FIG. 9B, the portions of the paste 200a are removed with the removal device 240 to form the dividing clearances 120a as the reducing parts 120. The dividing clearances 120a in the third embodiment are configured to extend in a plurality of directions. With such a configuration, for example, reduction can be made in warpage of the electrode film 200 related to the gas flow direction in addition to the warpage of the electrode film 200 related to the direction orthogonal to the gas flow direction.

In the separating step in the third embodiment, the reducing parts 120 are formed by removing the portions of the paste 200a with the removal device 240. An amount of the paste 200a to be removed with the removal device 240 can be appropriately set. A dividing clearance 120a is formed in an aspect of removing a portion of the applied paste 200a by the overall thickness of the applied paste 200a, as illustrated in FIGS. 9A to 9C. A groove-like delimiting groove 120b is formed in an aspect of removing a portion of the applied paste 200a by partial thickness of the applied paste 200a.

When the separating step according to the third embodiment is completed, the drying step is performed. In the drying step, the pastes 200a applied on the one surface of the working-electrode current collector 103 are dried and cured. As a result, the working electrode 104 formed of the electrode film 200 including the plurality of regions 110 and the dividing clearances 120a is formed on the one surface of the working-electrode current collector 103.

With the above steps, the working electrode 104 formed of the electrode film 200 including the plurality of regions 110 and the dividing clearances 120a is formed on the one surface side of the working-electrode current collector 103, by the manufacturing method according to the third embodiment.

Also in the third embodiment, as the manufacturing process of the electrode film 200 related to the counter electrode 106, the coating step, the primary drying step, the separating step, and the drying step are performed. As a result, the counter electrode 106 including the plurality of regions 110 and the dividing clearances 120a is formed on one surface side of the counter-electrode current collector 105. Note that the paste 200a used in the coating step in this case is formed into a paste form by mixing the constituent materials of the counter electrode 106, and includes the electroactive auxiliary material, the conductive assistant, and the binder.

As described above, according to a carbon dioxide recovery system 1 in accordance with the third embodiment, the operation and effect achieved from the configuration and operation common to those of the above embodiments can be obtained, even when the removal device 240 is used in the method of manufacturing the electrode film 200.

According to the method of manufacturing the electrode film 200 in accordance with the third embodiment, the electrode film 200 including the plurality of regions 110 and the reducing part 120 can be efficiently manufactured by performing the coating step, the primary drying step, the separating step, and the drying step, using the removal device 240.

By using the electrode film 200 manufactured through this manufacturing method, the warpage of the electrochemical cell 101 can be reduced, and thus the width of the gas passage 102 between the electrochemical cells 101 can be appropriately managed. Therefore, according to the carbon dioxide recovery system 1 using the electrode film 200 manufactured by this manufacturing method, reduction can be made in a decrease in the capability to recover the recovery target gas due to change in the gas passage 102 caused by the warpage of the electrochemical cell 101.

Fourth Embodiment

Next, a fourth embodiment different from the above embodiments will be described with reference to FIGS. 10A and 10B. The fourth embodiment is different from the above embodiments in the method of manufacturing the electrode film 200 forming each of the working electrode 104 and the counter electrode 106. Other basic configurations and the like are similar to those of the above embodiments, and thus repeated description thereof will be omitted.

Figure 10A:
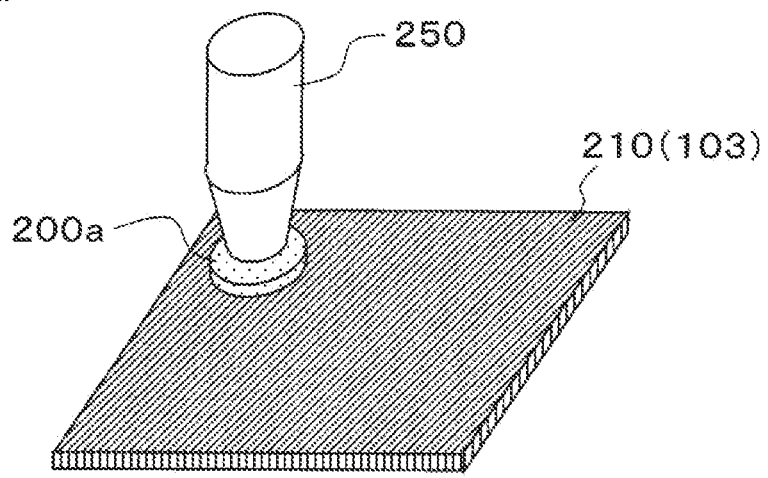
FIG. 10A is an explanatory view illustrating a coating step in a method of manufacturing an electrode film according to a fourth embodiment.
Figure 10B:
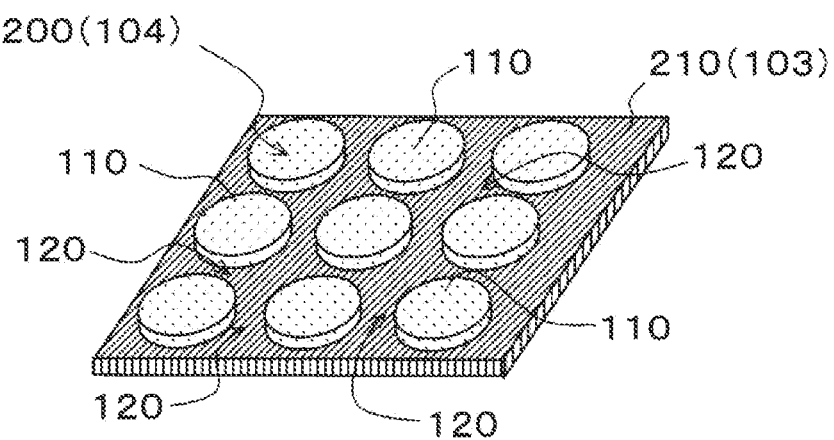
FIG. 10B is an explanatory view illustrating a drying step in a method of manufacturing an electrode film according to the fourth embodiment.

In the description of FIGS. 10A and 10B, similarly to the above embodiments, a method of manufacturing an electrode film 200 forming the working electrode 104 will be described, and the working-electrode current collector 103 is used as the substrate 210.

As illustrated in FIGS. 10A and 10B, in the method of manufacturing the electrode film 200 according to the fourth embodiment, a coating step and a drying step are performed. In the method of manufacturing the electrode film 200 according to the fourth embodiment, the movement of a dispenser 250 is controlled in the coating step of applying a paste 200a with the dispenser 250 to form a plurality of regions 110 and a reducing part 120.

Specifically, in the coating step in the fourth embodiment, the paste 200a, which is a member forming the electrode film 200, is applied with the dispenser 250 on a predetermined formation range of the electrode film 200 on one surface of the working-electrode current collector 103, which is the substrate 210.

The dispenser 250 is a device that accurately dispenses a predetermined amount of a liquid material, and applies the paste 200a as the liquid material onto the surface of the substrate 210 by dispensing the predetermined amount of the paste 200a.

In the coating step according to the fourth embodiment, the movement of the dispenser 250 is controlled, and the predetermined amount of the paste 200a is applied onto the one surface of the working-electrode current collector 103 as the substrate 210. The paste 200a applied on the surface of the substrate 210 in the predetermined amount forms one of the plurality of regions 110 in the electrode film 200.

The shape of the paste 200a applied with the dispenser 250 may be a disk shape as illustrated in FIGS. 10A and 10B. Alternatively, the paste 200a may have various shapes.

After the predetermined amount of the paste 200a is applied, the dispenser 250 moves from the paste 200a applied on the substrate 210 to be sufficiently spaced from the applied paste 200a, and newly applies the predetermined amount of a paste 200a.

When the application with the dispenser 250 and the movement of the dispenser 250 are repeated within the formation range of the electrode film 200 in the substrate 210, a plurality of regions 110 arranged in a dotted manner is formed within the formation range of the electrode film 200 as illustrated in FIGS. 10A and 10B. A portion onto which the paste 200a is not applied is formed between the regions 110, along with the movement of the dispenser 250. The portion onto which the paste 200a is not applied between the regions 110 functions as the reducing part 120, similarly to the dividing clearance 120a.

When the coating step according to the fourth embodiment is completed, the drying step is performed. In the drying step, the pastes 200a, which are arranged in a dotted manner and applied on the working-electrode current collector 103, are dried and cured. As a result, the working electrode 104 formed of the electrode film 200 including the plurality of regions 110 and the reducing part 120 is formed on the one surface of the working-electrode current collector 103.

With the above steps, the working electrode 104 formed of the electrode film 200 including the plurality of regions 110 and the reducing part 120 is formed on the one surface side of the working-electrode current collector 103, by the manufacturing method according to the fourth embodiment.

Also in the fourth embodiment, as the manufacturing process of the electrode film 200 related to the counter electrode 106, the coating step using the dispenser 250 and the drying step are performed. As a result, the counter electrode 106 including the plurality of regions 110 and the reducing part 120 is formed on one surface side of the counter-electrode current collector 105. Note that the paste 200a used in the coating step in this case is formed into a paste form by mixing the constituent materials of the counter electrode 106, and includes the electroactive auxiliary material, the conductive assistant, and the binder.

As described above, according to a carbon dioxide recovery system 1 in accordance with the fourth embodiment, the operation and effect achieved from the configuration and operation common to those of the above embodiments can be obtained, even when the plurality of regions 110 and the reducing part 120 are formed in the coating step using the dispenser 250.

According to the method of manufacturing the electrode film 200 in accordance with the fourth embodiment, the electrode film 200 including the plurality of regions 110 and the reducing part 120 can be efficiently manufactured by performing the coating step using the dispenser 250 and the drying step.

By using the electrode film 200 manufactured through this manufacturing method, the warpage of the electrochemical cell 101 can be reduced, and thus the width of the gas passage 102 between the electrochemical cells 101 can be appropriately managed. Therefore, according to the carbon dioxide recovery system 1 using the electrode film 200 manufactured by this manufacturing method, reduction can be made in a decrease in the capability to recover the recovery target gas due to change in the gas passage 102 caused by the warpage of the electrochemical cell 101.

Fifth Embodiment

Figure 11:
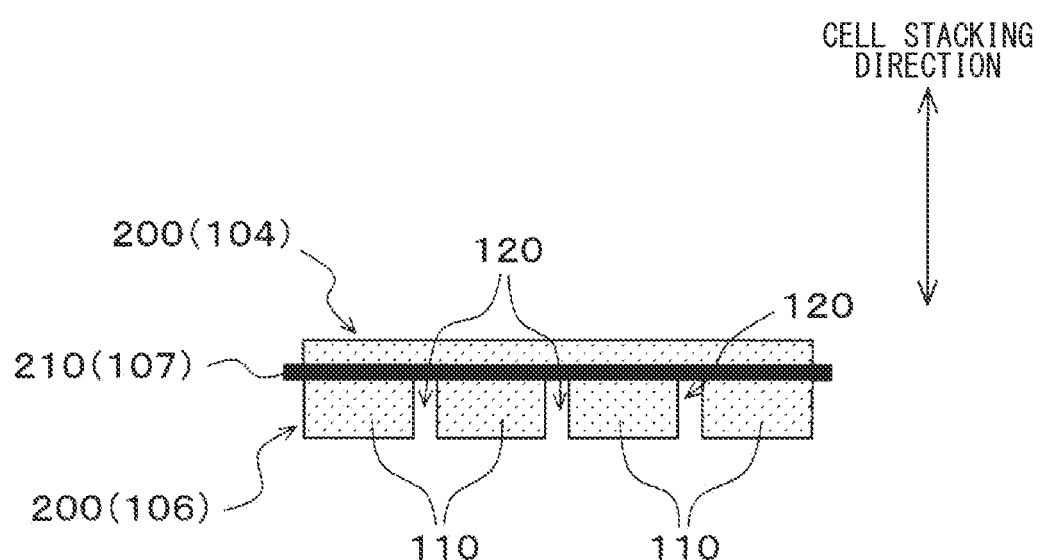
FIG. 11 is an explanatory view related to a method of manufacturing an electrode film according to a fifth embodiment.

Next, a fifth embodiment different from the above embodiments will be described with reference to FIG. 11. In the above embodiments, an aspect has been described in which the electrode film 200 is formed on the one surface side of each of the working-electrode current collector 103 and the counter-electrode current collector 105, each of which is the substrate 210. However, the separator 107 can also be used as the substrate 210. In the fifth embodiment, the separator 107 is used as the substrate 210. Other basic configurations and the like are similar to those of the above embodiments, and thus repeated description thereof will be omitted.

The electrochemical cell 101 is configured in an aspect where the working electrode 104 is in contact with one surface of the separator 107 and the counter electrode 106 is in contact with the other surface of the separator 107, as described in the bonding step in the above embodiment and as illustrated in FIGS. 3, 6, and 7.

Thus, the one surface of the separator 107 can be used as a substrate 210 related to a manufacturing process of an electrode film 200 related to the working electrode 104, and the other surface of the separator 107 can be used as a substrate 210 related to a manufacturing process of an electrode film 200 related to the counter electrode 106.

Note that any of the methods of manufacturing the electrode film 200 described in the above embodiments may be used for the manufacturing process of the electrode film 200 related to the working electrode 104 and the manufacturing process of the electrode film 200 related to the counter electrode 106.

When the electrode films 200 are manufactured on both surfaces (that is, the one surface and the other surface) of the separator 107, warpage is assumed to occur toward the one surface side or the other surface side of the separator 107 due to a difference in the respective thicknesses d of the electrode films 200 or the respective internal stresses a of the electrode films 200.

In this case, with respect to the respective electrode films 200 on the one surface side and the other surface side of the separator 107, a plurality of regions 110 and a reducing part 120 may be formed in one of the respective electrode films 200 on the one surface side and the other surface side, on the basis of the magnitude relationship between the respective thicknesses d of the electrode films 200 or the respective internal stresses a of the electrode films 200.

With respect to the thickness d of the electrode film 200, the plurality of regions 110 and the reducing part 120 may be formed in one electrode film 200 having a larger thickness d of the electrode film 200, of the respective electrode films 200 on the one surface side and the other surface side of the separator 107.

With respect to the internal stress a of the electrode film 200, the plurality of regions 110 and the reducing part 120 may be formed in one electrode film 200 having a larger internal stress a of the electrode film 200, of the respective electrode films 200 on the one surface side and the other surface side of the separator 107.

As described above, according to a carbon dioxide recovery system 1 in accordance with the fifth embodiment, the operation and effect achieved from the configuration and operation common to those of the above embodiments can be obtained, even when the separator 107 is used as the substrate 210 and the electrode films 200 are manufactured on both surfaces of the substrate 210.

OTHER EMBODIMENTS

The present disclosure is not limited to the above embodiments, and can be variously modified as follows without departing from the gist of the present disclosure. The means disclosed in each of the above embodiments may be appropriately combined within a feasible range.

(a) In the above embodiments, the gas recovery system according to the present disclosure is applied to the carbon dioxide recovery system 1 that recovers carbon dioxide from the gas mixture. However, the application of the gas recovery system according to the present disclosure is not limited to this. The gas recovery system according to the present disclosure may be applied to a system that recovers a specific type of gas other than carbon dioxide from a gas mixture. For example, the recovery target gas in the gas recovery system may be nitrogen oxide (NOx) gas or sulfur oxide (SOx) gas.

(b) At least one of the working electrode 104 or the counter electrode 106 of the electrochemical cell 101 may include the electrode film 200 including the plurality of regions 110 and the reducing part 120 described above.

(c) The shapes of the plurality of regions 110 in the electrode film 200 according to the present disclosure are not limited to the shapes illustrated in the above embodiments. The plurality of regions 110 in the electrode film 200 according to the present disclosure may have any shape as long as the shape has a size smaller than the size of the electrochemical cell 101, and may have a plurality of types of shapes and sizes.

(d) In the above embodiments, each of the dividing clearance 120a and the delimiting groove 120b is used as an example of the reducing part 120. However, various aspects can be employed for the shapes thereof. For example, the width of the dividing clearance 120a may be changed in accordance with the position in the electrochemical cell 101. The thickness of the delimiting groove 120b may be changed in accordance with the position in the electrochemical cell 101.

(e) The following process can also be used for the manufacturing process of the electrode film 200. For example, first, a mounting step, a coating step, and an area forming step are performed on a film or a release paper. That is, a state is created in which a paste 200a is applied onto the surface of the film or the release paper while the paste 200a includes a plurality of regions 110 and a reducing part 120. Next, drying is performed in a state where a substrate such as a current collector or a separator is brought into contact with the paste 200a on the film or the release paper. After the paste 200a is dried, the film or the release paper is removed. With the above process, the electrode film 200 including the plurality of regions 110 and the reducing part 120 can be formed on the surface of the substrate 210.

(f) In the fifth embodiment described above, the electrode films 200 are formed by applying the pastes 200a onto both surfaces (the front surface and the back surface) of the separator 107. However, the aspect is not limited to this aspect. That is, an electrode film 200 may be formed on one of the surfaces (any one of the front surface and the back surface) of the separator 107 by applying the paste 200a.

What is claimed is:

1. A gas recovery system configured to recover a recovery target gas from a gas mixture by causing an electrochemical reaction, the gas recovery system comprising:
a plurality of electrochemical cells stacked with each other; and
a gas passage formed between the plurality of electrochemical cells so as to allow the gas mixture to flow through the gas passage, wherein
each of the plurality of electrochemical cells having
a working electrode including an adsorbent configured to adsorb the recovery target gas, and
a counter electrode configured to exchange electrons with the working electrode, wherein
electron donation occurs from the counter electrode to the working electrode when a voltage is applied between the working electrode and the counter electrode, such that the adsorbent adsorbs the recovery target gas along with the electron donation,
at least one of the working electrode or the counter electrode includes an electrode film,
the electrode film includes a plurality of regions, each of which having a size smaller than a size of the electrochemical cell, and
a reducing part that reduces warpage of the electrode film is located adjacent to the plurality of regions.

2. The gas recovery system according to claim 1, wherein the reducing part includes a dividing clearance that divides the electrode film into the plurality of regions.

3. The gas recovery system according to claim 1, wherein the reducing part includes a delimiting groove that has a film thickness thinner than a film thickness of the plurality of regions.

4. The gas recovery system according to claim 1, wherein the reducing part extends along a flow direction of the gas mixture flowing through the gas passage.

5. A method of manufacturing an electrode film of at least one of a working electrode or a counter electrode in a gas recovery system configured to recover a recovery target gas from a gas mixture by causing an electrochemical reaction,
the gas recovery system comprising: a plurality of electrochemical cells stacked with each other; and a gas passage formed between the plurality of electrochemical cells so as to allow the gas mixture to flow through the gas passage,
the working electrode of the electrochemical cell includes an adsorbent configured to adsorb the recovery target gas,
the counter electrode of the electrochemical cell is configured to exchange electrons with the working electrode, wherein
electron donation occurs from the counter electrode to the working electrode when a voltage is applied between the working electrode and the counter electrode, such that the adsorbent adsorbs the recovery target gas along with the electron donation,
the electrode film includes a plurality of regions, each of which having a size smaller than a size of the electrochemical cell,
a reducing part that reduces warpage of the electrode film is located adjacent to the plurality of regions,
the method comprising:
placing a masking member including a plurality of openings on a substrate;
applying a constituent material of the electrode film to the substrate and the masking member;
forming the plurality of regions and the reducing part by removing the masking member after the applying is completed; and
drying the constituent material of the electrode film applied on the substrate.

* * * * *